Aug. 12, 1952  J. R. MADEIRA  2,606,646
CONVEYER LOADING STATION
Filed Aug. 29, 1947  5 Sheets-Sheet 3

INVENTOR.
John R. Madeira
BY Clarence F. Poole
ATTORNEY

Aug. 12, 1952        J. R. MADEIRA        2,606,646
CONVEYER LOADING STATION
Filed Aug. 29, 1947        5 Sheets-Sheet 5

INVENTOR.
John R Madeira
BY
Clarence F. Poole
ATTORNEY

Patented Aug. 12, 1952

2,606,646

UNITED STATES PATENT OFFICE 2,606,646

CONVEYER LOADING STATION

John R. Madeira, Chicago, Ill., assignor to Goodman Manufacturing Company, Chicago, Ill., a corporation of Illinois Application August 29, 1947, Serial No. 771,335

12 Claims. (Cl. 198—82)

This invention relates to improvements in conveyor loading stations particularly adapted for use in mines underground to load a belt conveyor with loose material such as coal from shuttle cars.

The principal objects of my invention are to provide a novel and improved form of loading station for loading a belt conveyor with coal from shuttle cars, so arranged as to change the direction of travel of material discharged by the shuttle car and move it in a direction parallel to the belt conveyor at a speed less than the speed of the belt conveyor to bring the material up to the speed of the belt conveyor in two stages, and effect a more uniform flow of material from the shuttle car to the belt conveyor with a minimum amount of dust and breakage of the lump coal.

In carrying out my invention I detachably mount a flight conveyor in a mine entry, so as to extend above and along a main line belt conveyor and travel in the same direction as the belt conveyor but at a slower speed than the speed of the belt conveyor, and load this flight conveyor from either of its sides directly from shuttle cars, and use the flight conveyor to change the direction of coal thereon and bring it up to a slower speed than the speed of the belt conveyor as it discharges it onto the belt conveyor, so the coal is brought up to the speed of the belt conveyor in two stages. I also provide depressible sides or aprons for the flight conveyor one of which is in a lowered position when the shuttle car approaches the flight conveyor and the opposite of which aprons is elevated to deflect coal discharged by the shuttle car onto the conveyor, and so arrange the controls for these aprons that the operator must raise the apron on the far side of the conveyor from which the shuttle car is positioned for unloading in order to start the flight conveyor, and must lower this apron on the far side of the conveyor as he leaves the conveyor, to stop the flight conveyor and have it ready for the shuttle car approaching the far side of the flight conveyor.

These and other objects of my invention will appear from time to time as the following specification proceeds and with reference to the accompanying drawings wherein.

Figure 1:
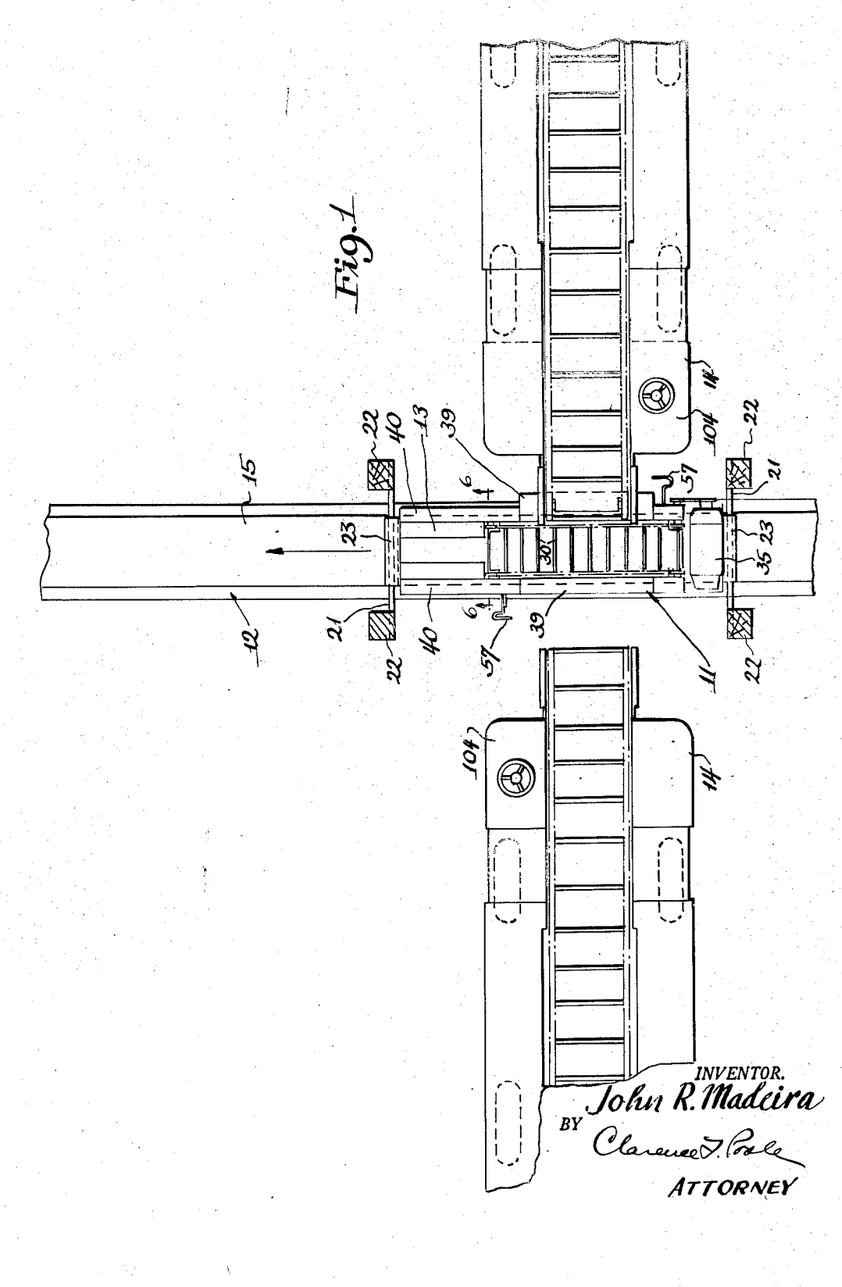
Figure 1 is a plan view of a loading station constructed in accordance with my invention, illustrating shuttle cars on opposite sides of the loading station, one of which is positioned in discharge relation with respect to said loading station and the other of which is pulling away from the opposite side of said loading station after having discharged its load thereon.

In Figure 1 of the drawings a loading station including a feeder conveyor 11 of the chain and flight type, is shown as being supported above and as extending along a belt conveyor 12 for discharging material from one of its ends through a flexible hopper 13 onto said belt conveyor. Shuttle cars 14, 14 are shown, one of which is in discharge relation with respect to said feeder conveyor while the other is moving away from said feeder conveyor after having discharged its load thereon. Said shuttle cars may be of any well known form commonly used in mines having conveyors extending along their bottoms for unloading the car by power, and are no part of my present invention so are not herein shown or described in detail.

Figure 2:
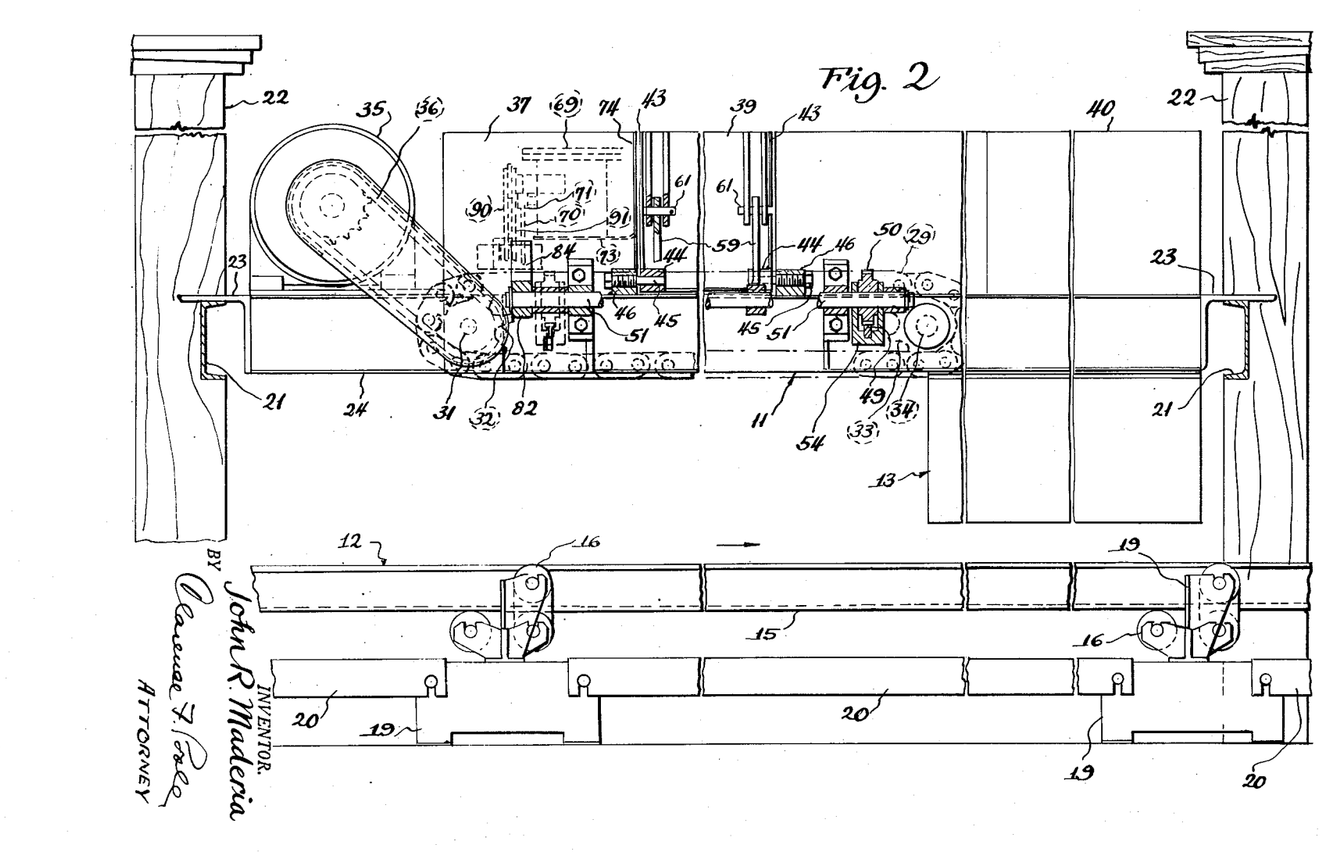
Figure 2 is an enlarged fragmentary view in side elevation of the loading station shown in Figure 1, with certain parts broken away and certain other parts shown in substantially longitudinal section.
Figure 6:
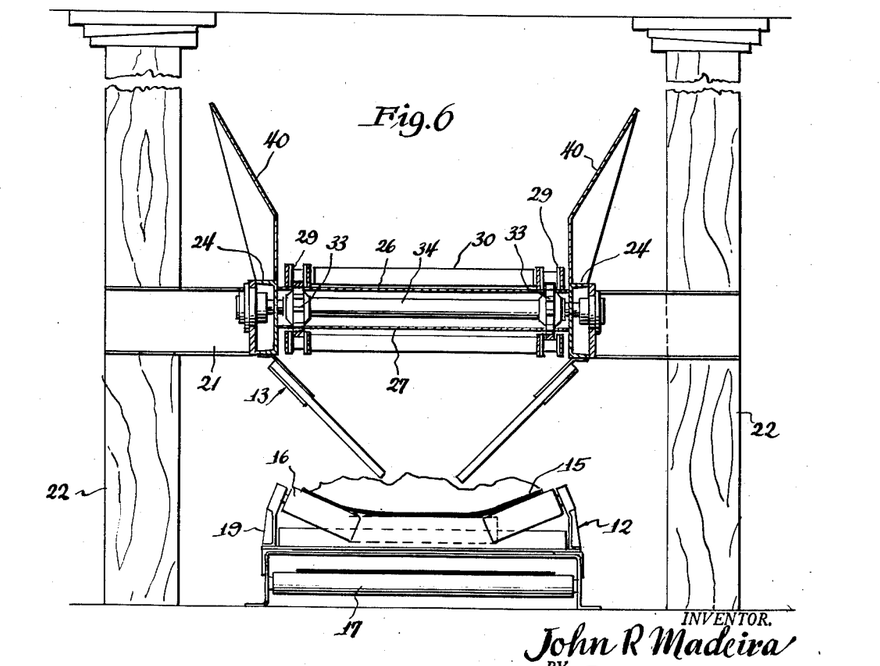
Figure 6 is an enlarged transverse sectional view taken substantially along line 6—6 of Figure 1.

The belt conveyor 12 may be of a well known form of sectional belt conveyor which may be extended as the workings of the mine are extended, and is herein shown as being a trough type of belt conveyor wherein the upper run of a belt 15 is supported on troughed rollers indicated generally by reference character 16, which form the belt in the form of a trough to carry coal therealong and wherein a lower or return run of the belt is on flat rollers 17, 17 (see Figures 2 and 6). Said troughed rollers and said flat rollers are mounted on standards 19, 19 spaced at intervals along the conveyor and detachably held in spaced relation with respect to each other by spacing members 20, 20, as is well known to those skilled in the art.

The feeder conveyor 11 is herein shown as being supported at its opposite ends on transverse channels 21, 21 which are suitably secured adjacent their ends to laterally spaced props or timbers 22, 22 interposed between and held in position between the mine roof and the mine floor in a well known manner. Angle irons 23, 23 are secured on their vertical legs to opposite ends of channels 24, 24. Said channels form side frame members for the feeder conveyor frame. The horizontal legs of said angle irons rest on said channels, to detachably support said feeder conveyor above said belt conveyor in substantially parallel relation with respect thereto.

The frame for the feeder conveyor 11 is formed from the parallel spaced longitudinally extending channels 24, 24 connected together at their opposite ends by the angle irons 23, 23, and from a conveyor bottom plate 26 secured therebetween and extending therealong for a portion of the length of said channels. A plate 27 is mounted beneath said bottom plate and extends therealong in parallel relation with respect thereto, to stiffen the structure of said frame.

Two parallel spaced endless chains 29, 29 having parallel spaced flights 30, 30 connected therebetween are movable along and progress material along the bottom plate 26, towards the hopper 13. Said chains are trained around drive sprockets 32, 32 on a transverse shaft 31 at one end of said conveyor and extend from said drive sprockets along the bottom plate 26, to and around idler sprockets 33, 33 at the discharge end of said conveyor and the receiving end of the hopper 13. Said idler sprockets are mounted on a transverse shaft 34, journaled at its ends in the channels 24, 24. A motor 35, mounted at the rear end of said frame on the channels 24, 24, is provided to drive said chains and flights at a slower speed than the speed of the belt conveyor 12. Said motor may be of any well known form of electric motor having a speed reducer (not shown) enclosed in a continuation of the casing thereof, and drives said shaft 31 and sprockets 32, 32 at the required speed through said speed reducer and a chain and sprocket drive 36.

Figure 5:
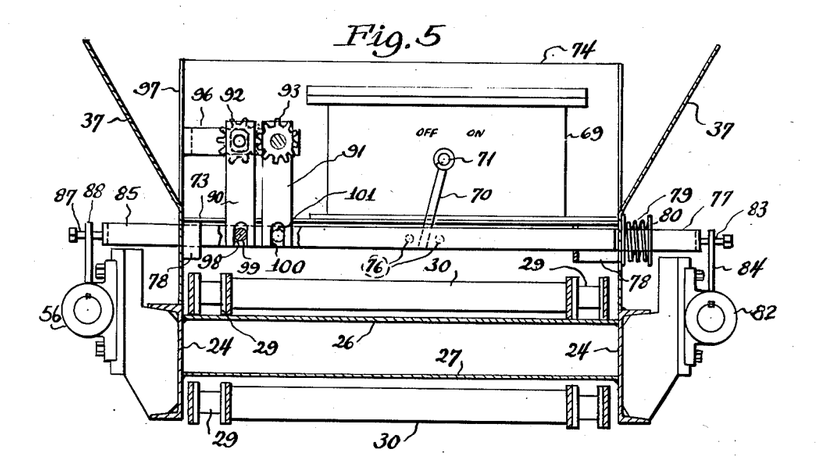
Figure 5 is a fragmentary enlarged transverse sectional view taken substantially along line 5—5 of Figure 3.

Side walls 37, 37 extend upwardly from the channels 24, 24 forwardly of the motor 35 (see Figures 2 and 5). Said side walls extend for a portion of the length of the conveyor 11 in alignment with the inner sides of said channels 24, 24 for a short part of their height and then flare angularly outwardly. Pivoted material retaining aprons 39, 39 form forward continuations of said side walls 37, 37 and are longitudinally pivoted on the top flanges of said channels. One of said aprons is adapted to be pivoted downwardly during loading of the feeder conveyor by a shuttle car, to permit the discharge end of the shuttle car to pass thereover to discharge coal onto said feeder conveyor. The opposite apron is adapted to be in an upwardly extended position to retain coal discharged by said shuttle car on said conveyor. Side walls 40, 40 extending upwardly from said channels and flaring outwardly therefrom form forward continuations of said aprons, when in upright positions, and extend beyond the discharge end of said conveyor along the hopper 13 to the forward ends of said channels.

The aprons 39, 39 are each of a similar construction and operation and are pivotally mounted on said channels in a similar manner, so one of said aprons only need herein be described in detail.

Figure 3:
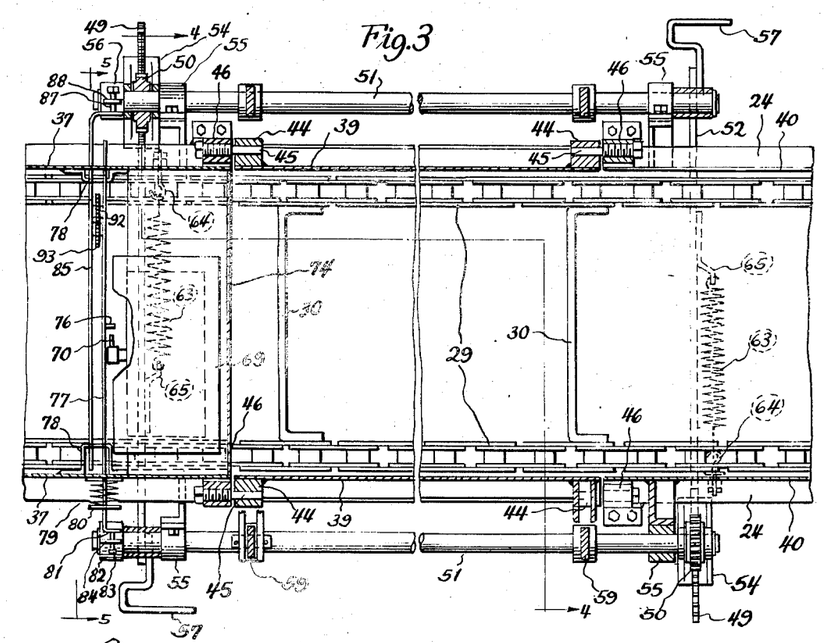
Figure 3 is an enlarged detail fragmentary plan view of the loading station shown in Figure 1, with certain parts broken away and certain other parts shown in horizontal section.
Figure 4:
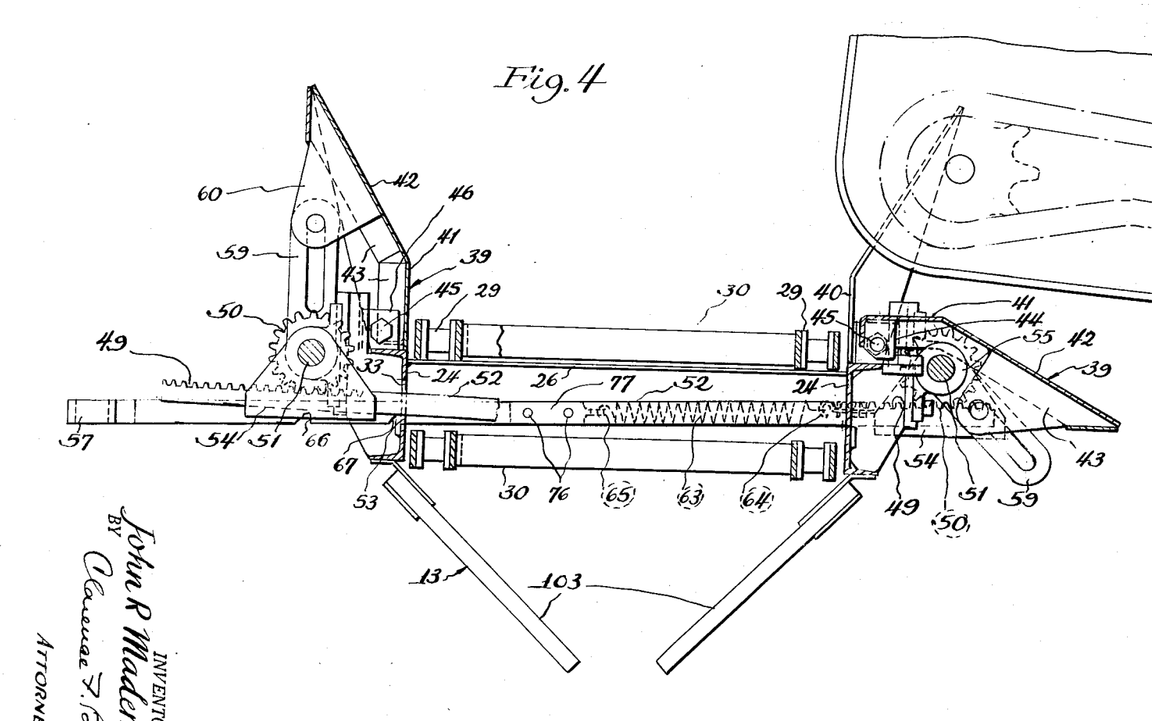
Fig. 4 is an enlarged transverse sectional view taken substantially along line 4—4 of Figure 3.
Figure 7:
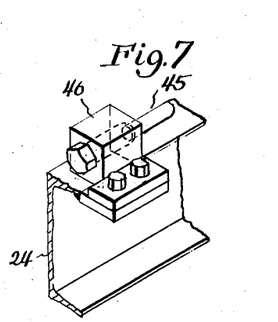
Figure 7 is an enlarged view showing certain details of the hinged mounting for one of the deflecting aprons of the loading station.

The apron 39 when in an upright position has a vertical wall portion 41 and an outwardly flared portion 42 forming a continuation of said vertical wall portion and extending upwardly therefrom (see Figure 4). Said apron is reinforced and stiffened adjacent its opposite ends by longitudinally spaced stiffening ribs 43, 43 extending upwardly along the outer sides thereof. Blocks 44, 44 are secured to each end of said vertical wall portion of said apron, at the bottom thereof, when said apron is in a vertical position, and project outwardly from said vertical wall portion. Said blocks are pivotally mounted on longitudinally extending pins 45, 45 herein shown as being formed on the ends of bolts threaded in blocks 46, 46 and extending therethrough and towards each other. Said blocks are secured to the top flange of the channel 24 in longitudinally spaced relation with respect to each other (see Figures 3 and 7).

The means for pivoting the apron 39 upwardly to cause said apron to form a material retaining side wall for the conveyor and downwardly to accommodate said apron to the discharge end of a shuttle car during the unloading operation includes a rectilinearly movable rack 49 meshing with a pinion 50 secured to a longitudinal shaft 51. Said rack is formed on one end of a bar 52 slidably guided in aligned slots 53, 53 in opposite channels 24, 24. Said rack is also slidably mounted in the bottom of a U-frame or cradle 54 pivotally mounted adjacent its upper end on said longitudinal shaft 51, to permit free vertical movement of said bar and rack about the axis of said shaft, to permit said bar to be locked in or unlocked from its several operative positions. Said cradle abuts the outer side of a boss 55, which forms a bearing support for said shaft. A collar 56 on the outer or rear end of said shaft abuts the outer side of said bracket and holds said cradle on said shaft.

A hand grip 57 is formed on the end of said bar opposite from the rack 49, to afford a means for rectilinearly moving said bar and rack by hand and pivotally moving said apron from the side of the conveyor opposite from said apron. Two longitudinally spaced slotted rocking arms 59, 59 are secured to said shaft and extend upwardly therefrom when the apron 39 is in upright position. Each of said arms extends between a pair of parallel spaced ears 60, 60 projecting outwardly and downwardly from the flared side wall portion 42. Said ears are pivotally and slidably connected to said arms by means of pivotal pins 61, 61 secured at their ends to said ears and extending through the slotted portions of said lever arms.

Upon movement of the hand grip 57 on the right-hand side of the conveyor in a direction towards the conveyor and movement of the rack 49 in a direction away from the conveyor, the pinion 50 on the left-hand side of the conveyor will rotate in a clockwise direction and pivot the shaft 51, lever arms 59, 59 and apron 39 upwardly in the same direction, to position said apron in the upwardly extended position shown in Figure 4. Upon movement of said hand grip in a direction away from the conveyor, said apron will be pivoted downwardly to a depressed position to permit the discharge end of a shuttle car to pass thereover into discharge relation with respect to said feeder conveyor.

A tension spring 63 is provided to urge the bar 52 in a direction to elevate the apron 39. Said spring is connected at one of its ends to a hook 64 secured to a web of the channel 24 and extending inwardly therefrom. Said spring is connected at its opposite end to a hook 65 secured to the bar 52 and tends to move the hand grip 57 towards the conveyor. Two spaced notches 66 and 67 are formed in the bottom of the bar 52 and open towards the ground. Said notches are adapted to engage the web of the slot 53 in the channel 24, through which the bar 52 slidably extends, to hold said bar in position to lock said apron in either an upright or a depressed position. Release of said notches from said channel is effected by upward movement of said bar about the axis of the shaft 51.

A control means is provided to control operation of the motor 35, which is operable to start said motor and feeder conveyor upon movement of either of the aprons 39, 39 to upright material retaining positions while the opposite apron is in a down position, or while both aprons are in up positions, and to stop said motor and conveyor when the two aprons are in lowered positions. When the two aprons are down it is thus necessary for the operator of the shuttle car to raise the apron on the opposite side of the conveyor from which the shuttle car is unloading before the feeder conveyor starts. This prevents the operator from unloading a shuttle car onto the conveyor when the far apron is in a depressed position.

The control means for controlling operation of the motor 35 includes a starter (not shown) enclosed in a casing 69 and operated by a control lever 70 on the end of a shaft 71 extending within said casing. Said starter and the operative connection between said shaft and starter may be of any well known form, and are no part of my present invention, so are not herein shown or described in detail. Said casing is mounted above the feeder conveyor 11 between the side walls 37, 37 on a supporting shelf 73 secured at its ends to said side walls 37, 37 and extending rearwardly from a transverse wall 74, mounted between said side walls.

The lever 70 depends from the shaft 71 between two longitudinally spaced pins 76, 76. Said pins project forwardly from a transverse bar 77. Said bar is slidably guided in slotted portions of opposite side walls 37, 37, and in guide members 78, 78 secured to said side walls and extending inwardly therefrom. A compression spring 79 encircles one end of said bar. Said spring is interposed between the outer side of the vertical wall portion of a side wall 37 at one of its ends, and a collar 80 secured to said bar, at its opposite end. Said spring serves to move said bar in a direction to move the lever 70 in position to turn off the electric circuit to the motor 35. The bar 77 has an end 81 spaced outwardly from the spring 79 and turned to extend longitudinaly of the conveyor 11 towards its discharge end. Said end 81 is adapted to be engaged by the end of a set screw 83, threaded in and extending through the upper end of a rocking arm 84. Said rocking arm is herein shown as being secured to and extending upwardly from a collar 82, secured to the rear end of the right-hand shaft 51 when looking towards the discharge end of the conveyor, and rocks with said shaft 51 to rectilinearly move said bar in a direction to turn the control lever 70 to a position to start the motor 35.

A bar 85 is slidably mounted in opposite side walls 37, 37 and in the guide members 78, 78. Said bar extends in parallel relation with respect to the bar 77 and is herein shown as being spaced therefrom in a direction away from the discharge end of the feeder conveyor 11. The left-hand end of said bar is turned to extend towards the discharge end of said feeder conveyor and is slidably engaged by a set screw 87 threaded in and extending through the upper end of a rocking arm 88 on the opposite side of said conveyor from the arm 84. Said arm is secured to and extends upwardly from the collar 56 on the rear end of the left-hand shaft 51, when looking towards the discharge end of said feeder conveyor, to permit operation of the lever 70 from either side of said feeder conveyor.

Figure 8:
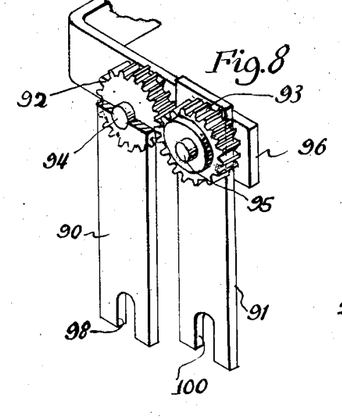
Figure 8 is an enlarged detail view showing certain details of the means for operating the switch to stop and start the flight conveyor motor.

The bar 85 is operatively connected with the bar 77 to move said bar 77 in a direction opposite to the direction of movement of said bar 85 by means of two laterally spaced rocking arms 90, 91 depending from two meshing pinions 92, 93, respectively, and secured thereto. Said pinions are mounted on transverse shafts 94, 95, respectively, secured to and projecting rearwardly from a support bracket 96, extending inwardly from a longitudinal wall 97 extending rearwardly from the rear wall 74 of the support for the casing 69. The rocking arm 90 has a slot 98 opening towards the ground, formed in its lower end, which slidably engages a pin 99 secured to the bar 85 and extending forwardly therefrom. The rocking arm 91 has a slot 100 opening towards the ground, formed in its lower end, which slidably engages a pin 101 secured to the bar 77 and extending rearwardly therefrom (see Figures 5 and 8). It should here be noted with reference to Figure 8 that the rocking arm 90 is secured to one face of the pinion 92 while the rocking arm 91 is secured to the opposite face of the pinion 93, to permit said rocking arms to clear each other when rocking in opposite directions.

Upon movement of the lever arm 88 and bar 85 in a direction towards the conveyor, effected by movement of the hand grip 57 on the right-hand side of the conveyor towards the conveyor, to raise the apron 39 on the left-hand side of the conveyor, the rocking arm 90 will rock in a counterclockwise direction and will turn the pinion 92 in the same direction. This will turn the pinion 93 in a clockwise direction and rock the rocking arm 91 in the same direction, to move the transverse bar 77 in a direction opposite to the direction of movement of said transverse bar 85 or to the left, to turn the lever 70 in a direction to turn power on to start the motor 35 and feeder conveyor 11.

When the apron 39 on the right-hand side of the conveyor is down and upon movement of said hand grip 57 on the right-hand side of the conveyor in a direction to lower the apron 39 on the left-hand side of the conveyor, the set screw 87 will move away from the longitudinally turned end of said bar 85 and the compression spring 79 will move the bar 77 in a direction to turn the lever 70 to an off position. Movement of said bar 77 by means of said spring will move said bar 85 in a direction opposite to the direction of movement of said bar 77 to cause said bar 85 to follow the set screw 87 and be in position to operate when said left-hand apron is again elevated.

It should here be understood that when the two aprons are up, the feeder conveyor will run, and that when the right-hand apron is lowered when the left-hand apron is already up, the lever arm 88 and bar 87 will hold the bar 77 from being moved by the spring 79 and that the conveyor will continue to run until the left-hand apron is lowered.

The flexible hopper 13 at the discharge end of the flight conveyor 11 includes the flared side walls 40, 40 extending upwardly from the channels 24, 24 and also includes two laterally spaced flexible deflecting members 103, 103 arranged to direct the coal onto the central part of the belt conveyor 12 and retain the discharged coal thereon, and also break the fall of the coal as it is discharged onto said belt conveyor. Said deflectors 103, 103 are herein shown as being secured to the bottom flanges of the channels 24, 24 and extending downwardly and angularly inwardly therefrom towards each other with a gap between their lower ends to permit the coal to readily pass thereby. Said deflecting members may be made from heavy conveyor belting or a canvas backed rubber faced material known to the trade as "Armorite," or any other suitable material.

In starting operation of the loading station of my invention, the two aprons 39, 39 are initially in down positions. The flight conveyor 11 will then be stopped. As a loaded shuttle car approaches said flight conveyor it is moved into position so its forward or discharge end will extend over one lowered apron 39 into discharge relation with respect to said flight conveyor.

The operator in an operating compartment 104 of the shuttle car may then take hold of the hand grip 57, adjacent said operating compartment and release the notch 67 from the web of the channel 24 and then move this hand grip inwardly aided by the spring 63 until the notch 66 is in position to engage the web of said channel. Said apron will then be in an upright position. At the same time the motor 35 and conveyor 11 will start, by movement of the transverse bar 77 and control lever 70 with the bar 52, in the hereinbefore described manner. After the shuttle car is fully unloaded, the operator may then take hold of the hand grip 57 and release the notch 66 from the web of the channel 24 and then may pull said hand grip outwardly against the spring 63, to lower the apron 39 on the far side of said shuttle car, to permit the next shuttle car to discharge its load onto the opposite side of said transfer conveyor from said first mentioned shuttle car. The motor 35 and conveyor 11 will then stop by operation of the transverse bar 77, as has previously been described. The next shuttle car may then move into loading position with its discharge end extending over the apron 39, depressed by the operator of the first mentioned shuttle car, while said first mentioned shuttle car, on the opposite side of said loading station, is pulling away to gather a new load. The operator on the next shuttle car may then take hold of the hand grip 57 and release the notch 67 from the web of the channel 24, and move said hand grip inwardly aided by the spring 63, to elevate the apron 39 on the far side of the conveyor from said next shuttle car, and at the same time start the motor 35 and conveyor 11. After the next shuttle car has discharged its load onto said transfer conveyor and is ready to move away and pick up a new load, the operator may lower the apron on the far side of the conveyor by operation of the hand grip on his side of the conveyor, to stop the conveyor 11 and leave the loading station in position for loading by another shuttle car from the far side of said station from said last mentioned shuttle car.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. A loading station for loading a belt conveyor with loose material, such as coal, directly from shuttle cars in mines including a feeder conveyor mounted above the belt conveyor and extending therealong and adapted to be loaded from its opposite sides and change the direction of travel of material discharged thereon and cause the material to flow in the direction of the belt conveyor and at a slower speed than the speed of the belt conveyor so as to bring the material up to the speed of the belt conveyor in two stages, a deflecting apron extending along each side of said feeder conveyor and longitudinally pivoted thereto, a separate manually operable rocking arm connected with each of said aprons for pivotally moving said aprons downwardly to permit the discharge end of a shuttle car to extend thereover for unloading onto said feeder conveyor and a separate transversely extending rectilinearly movable bar for rocking each of said rocking arms and having an operating handle on the end opposite from the rocking arm it operates, to raise or lower said aprons from the opposite sides of the feeder conveyor from which they are located.

2. A loading station for loading a belt conveyor with loose material, such as coal, directly from shuttle cars in mines including a feeder conveyor mounted above the belt conveyor and extending therealong and adapted to be loaded from either of its sides, said feeder conveyor being arranged to change the direction of travel of material discharged thereon by the shuttle cars and cause the material to flow in the direction of the belt conveyor and at a slower speed than the speed of the belt conveyor so as to cause the material to be brought up to the speed of said belt conveyor in two stages, a motor, a drive connection from said motor to said feeder conveyor for driving said feeder conveyor at a slower speed than the speed of said belt conveyor, a deflecting apron extending along each side of said feeder conveyor and longitudinally pivoted thereto, a separate manually operable rocking arm connected with each of said aprons for pivoting said aprons downwardly to permit the discharge end of a shuttle car to extend thereover, for unloading onto said feeder conveyor, and upwardly to retain material onto said conveyor, a separate transversely extending rectilinearly movable bar for rocking each of said rocking arms and having an operating handle on its opposite end from the arm it operates, to raise or lower said aprons from the opposite sides of the conveyor from which they are located, means for starting and stopping said motor and conveyor, and operative connections between said bars and said starting means, for turning said starting means to an on position upon raising of the apron opposite from the shuttle car which is moving into position to discharge into said feeder conveyor over a lowered apron, and to stop said motor upon lowering said opposite raised apron into position to receive the next shuttle car approaching said feeder conveyor.

3. A loading station for loading a belt conveyor with loose material, such as coal, directly from shuttle cars in mines including a feeder conveyor mounted above the belt conveyor and extending therealong and adapted to be loaded from either of its sides, said feeder conveyor including a frame, means for detachably mounting said frame above said belt conveyor to extend therealong for a short portion of the length of said belt conveyor, a chain flight conveyor extending along said frame and adapted to discharge material from one of its ends onto said belt conveyor, depressible aprons extending along opposite sides of said frame and forming material retaining side walls for said conveyor when in upright positions, and depressible to permit a shuttle car to extend its discharge end thereover for loading onto said feeder conveyor from the side thereof, and an operative connection to each of said aprons manually operable to elevate or depress the apron on one side of the conveyor from the opposite side of the conveyor and including a separate rocking arm operatively connected with each of said aprons and pivotally movable about an axis extending longitudinally of said frame, and a separate rectilinearly movable bar operatively connected with each of said rocking arms and operated from the side of the conveyor opposite their associated rocking arms.

4. A loading station for loading a belt conveyor with loose material, such as coal, directly from shuttle cars in mines including a feeder conveyor mounted above the belt conveyor and extending therealong and adapted to be loaded from either of its sides, said feeder conveyor including a frame, means for detachably mounting said frame above said belt conveyor to extend therealong for a short portion of the length of said belt conveyor, a chain flight conveyor extending along said frame and adapted to discharge material from one of its ends onto said belt conveyor, depressible aprons extending along opposite sides of said frame and forming material retaining side walls for said conveyor when in upright positions, and depressible to permit a shuttle car to extend its discharge end thereover for loading onto said feeder conveyor from the side thereof, and an operative connection to each of said aprons, manually operable to elevate or depress the apron on one side of the conveyor from the opposite side of the conveyor and including a transverse shaft extending along each side of the conveyor, rocking arms on said shafts and rocked thereby and having operative connection with said aprons, for elevating or depressing said aprons upon pivotal movement of said shafts, two transversely extending rectilinearly movable bars guided in said frame, each of said bars having operative connection with one of said shafts for pivotally moving said shafts upon rectilinear movement of said bars, and a hand grip on the end of said bar opposite the shaft it operates for rectilinearly moving said bar and operating said shaft to elevate or lower the apron on the opposite side of the conveyor from which said hand grip is located.

5. A loading station for loading a belt conveyor with loose material, such as coal, directly from shuttle cars in mines including a feeder conveyor mounted above the belt conveyor and extending therealong and adapted to be loaded from either of its sides, said feeder conveyor including a frame, means for detachably mounting said frame above said belt conveyor to extend therealong for a short portion of the length of said belt conveyor, a chain flight conveyor extending along said frame and adapted to discharge material from one of its ends onto said belt conveyor, depressible aprons extending along opposite sides of said frame and forming material retaining side walls for said conveyor when in upright positions, and depressible to permit a shuttle car to extend its discharge end thereover for loading onto said feeder conveyor from the side thereof, and an operative connection to each of said aprons operable to elevate or depress the apron on one side of the conveyor from the opposite side of the conveyor, including two bars mounted for slidable movement transversely of said conveyor, and two shafts extending longitudinally along opposite sides of said feeder conveyor and rocked by said bars, a rack on one end of each of said bars, a pinion on each of said shafts meshing with one of said racks, interengaging connections between said bars and frames for locking said bars in their several operative positions, and a cradle pivotally mounted on each of said shafts, said cradles each having one of said bars slidably guided therein, for holding said racks in mesh with said pinions and permitting movement of said bars about the axes of said shafts, to permit locking of said bar in and unlocking of said bar from its several operative positions.

6. A loading station for loading a belt conveyor with loose material, such as coal, directly from shuttle cars in mines including a feeder conveyor mounted above the belt conveyor and extending therealong and adapted to be loaded from either of its sides, said feeder conveyor including a frame, means for detachably mounting said frame above said belt conveyor to extend therealong for a short portion of the length of said belt conveyor, a chain flight conveyor extending along said frame and adapted to discharge material from one of its ends onto said belt conveyor, a motor for driving said flight conveyor, a longitudinally pivoted apron extending along each side of said frame and movable into an upright position to form a material retaining side wall for said flight conveyor and depressible to a horizontally extending position to permit a shuttle car to extend its discharge end thereover, for loading onto said feeder conveyor, an operative connection to each of said aprons manually operable to elevate or depress the apron on one side of the conveyor from the opposite side of the conveyor including a shaft extending along each side of said feeder conveyor, a rocking arm on each of said shafts and having operative connection with one of said aprons for elevating or lowering said aprons upon rocking movement thereof, a separate rectilinearly movable bar operatively connected with each of said shafts for rocking said shafts upon rectilinear movement of said bar, interengaging connections between said bars and frame for locking said bars and aprons in their several operative positions, and hand grips on the ends of said bars opposite from the shafts they operate, to permit manual operation of said aprons from the opposite sides of the conveyor from which they are located.

7. A loading station for loading a belt conveyor with loose material, such as coal, directly from shuttle cars in mines including a feeder conveyor mounted above the belt conveyor and extending therealong and adapted to be loaded from either of its sides, a motor for driving said feeder conveyor, a longitudinally pivoted apron extending along each side of said feeder conveyor and movable into an upright position to form a material retaining side wall for said conveyor and depressible to a horizontally extending position to permit a shuttle car to extend its discharge end thereover for loading onto said feeder conveyor, an operative connection to each of said aprons manually operable to elevate or depress the apron on one side of the conveyor from the opposite side of the conveyor including a shaft extending along each side of said feeder conveyor, a rocking arm on each of said shafts and having operative connection with one of said aprons for elevating or lowering said aprons upon rocking movement thereof, and operative connections from said shafts to said motor, to start said motor and conveyor when one apron is down and the other apron is moved from a down to an up position and to stop said motor when both of said aprons are in down positions, including two oppositely movable bars, one of which is moved transversely by one of said shafts and the other of which is moved in an opposite direction by the other of said shafts, one of said bars being operable to stop or start said motor upon rectilinear movement thereof, a reversing connection between said last mentioned bars, to move one bar in a direction opposite to the other upon rectilinear movement of said other bar and start said motor upon movement of either of said aprons to an upright material retaining position.

8. A loading station for loading a belt conveyor with loose material, such as coal, directly from shuttle cars in mines including a feeder conveyor mounted above the belt conveyor and extending therealong and adapted to be loaded from its opposite sides and change the direction of travel of material discharged thereon and cause the material to flow in the direction of the belt conveyor and at a slower speed than the speed of the belt conveyor so as to bring the material up to the speed of the belt conveyor in two stages, a deflecting apron extending along each side of said feeder conveyor and longitudinally pivoted thereto for movement from a depressed position free from the discharge end of the shuttle car into an elevated deflecting position, and a separate operating member for each apron operated from the opposite side of the conveyor from the apron being rocked for independently rocking said aprons from depressed to upright deflecting positions according to the direction of approach of a loaded shuttle car to said feeder conveyor.

9. A loading station for loading a belt conveyor with loose material, such as coal, directly from shuttle cars in mines including a feeder conveyor mounted above the belt conveyor and extending therealong and adapted to be loaded from its opposite sides and change the direction of travel of material discharged thereon and cause the material to flow in the direction of the belt conveyor and at a slower speed than the speed of the belt conveyor so as to bring the material up to the speed of the belt conveyor in two stages, a deflecting apron extending along each side of said feeder conveyor and longitudinally pivoted thereto for independent movement from depressed positions free from the discharge end of the shuttle car to upward deflecting positions, a separate operating member for each of said aprons, and means operable by said operating members in accordance with the position of said aprons for controlling the operation of said feeder conveyor.

10. A loading station for loading a belt conveyor with loose material, such as coal, directly from shuttle cars in mines including a feeder conveyor mounted above the belt conveyor and extending therealong and adapted to be loaded from its opposite sides and change the direction of travel of material discharged thereon and cause the material to flow in the direction of the belt conveyor and at a slower speed than the speed of the belt conveyor so as to bring the material up to the speed of the belt conveyor in two stages, a deflecting apron extending along each side of said feeder conveyor and longitudinally pivoted thereto to move from a depressed position free from the discharge end of the shuttle car into an elevated deflecting position, a separate operating member for each of said aprons for independently rocking said aprons to an upright deflecting position according to the direction of approach of a loaded shuttle car to said feeder conveyor, and control means for said conveyor operated by said operating members in accordance with the position of said aprons for controlling the operation of said feeder conveyor.

11. In a loading station for loading a conveyor with loose material, such as coal, directly from shuttle cars comprising a frame, an endless conveyor movable along said frame, a deflecting apron extending longitudinally along each side of said frame and longitudinally pivoted thereto to move from an upright deflecting into a depressed position free from the discharge end of the shuttle car, a separate operating member for each apron, said members extending from one side of said frame to the other and being operated from one side of said frame to operate the apron on the opposite side thereof, means for operating said conveyor, and operative connections from said operating members to said conveyor operating means, to operate said conveyor when either one of said aprons is in an upwardly extended position and to stop operation of said conveyor when both of said aprons are in a depressed position.

12. In a loading station for an endless conveyor for loading the conveyor with loose material, such as coal, directly from shuttle cars, a frame, an endless conveyor guided for movement along said frame, a motor for driving said conveyor, a starter for said motor, a deflecting apron extending longitudinally along each side of said frame and longitudinally pivoted thereto, to move from an upright deflecting position into a depressed position free from the discharge end of the shuttle car to permit the shuttle car to load over said apron, a separate rectilinearly movable operating member for each apron, said members extending from one side of said frame to the other and being operative from one side of said frame to operate the apron on the opposite side thereof, and members operatively connected between said rectilinearly movable operating members and said starter to operate said starter to start said motor to drive said conveyor when either apron is in an upwardly extended position, and to stop said motor and conveyor when both of said aprons are in a depressed position.

JOHN R. MADEIRA.

REFERENCES CITED

The following references are of record in the file of this patent:

UNITED STATES PATENTS

| Number | Name | Date |
|---|---|---|
| 1,313,695 | Jackson | Aug. 19, 1919 |
| 1,357,456 | Jones | Nov. 2, 1920 |
| 2,362,677 | Stephens | Nov. 14, 1944 |
| 2,367,609 | Prins | Jan. 16, 1945 |

FOREIGN PATENTS

| Number | Country | Date |
|---|---|---|
| 328,054 | Great Britain | Apr. 24, 1930 |